April 17, 1928.
J. L. CONNOLLY
1,666,167
RAILWAY RAIL, WHEEL, AND BRAKE SHOE
Filed Sept. 27, 1927
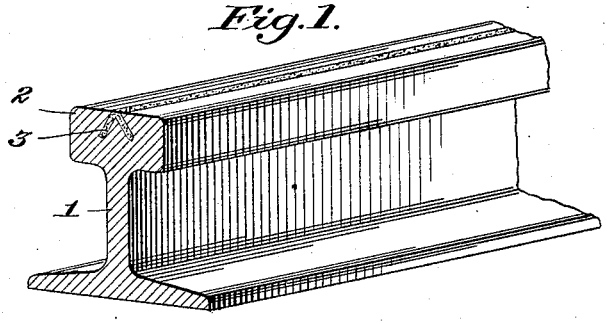
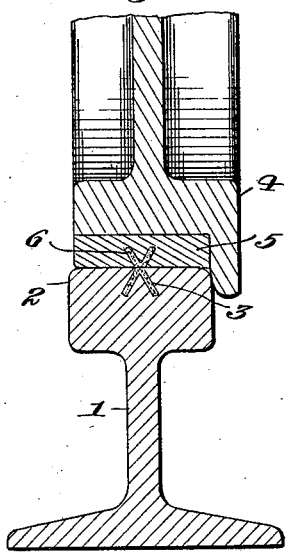
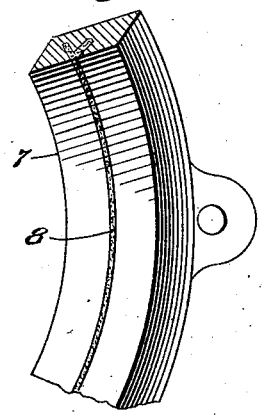
Inventor:
John L. Connolly,
by Edmund H. Parry
Att'y.

Patented Apr. 17, 1928.

1,666,167

UNITED STATES PATENT OFFICE.

JOHN LAURENCE CONNOLLY, OF NEW YORK, N. Y.

RAILWAY RAIL, WHEEL, AND BRAKE SHOE.

Application filed September 27, 1927. Serial No. 222,367.

This invention relates to improvements in railway rails, wheels and brake-shoes.

It is an object of this invention to increase the friction between the rail and wheels at certain points to prevent skidding and also to increase traction so that, with constant power, a given load will be drawn at greater speed, or a greater load at a given speed. Also, by my invention, the wear of the rail and wheel-tread is reduced, thus prolonging the life of both.

It is a further object of this invention to increase the power and efficiency of the brakes by providing the brake-shoes with friction inserts adapted to contact with similar inserts in the wheel-treads, thus eliminating the use of sand and yet facilitating and insuring safer stops.

A further object of this invention is to provide railway rails, wheels and brake-shoes with a groove of particular shape adapted to securely retain a friction compound therein and present the same at the bearing surface of these elements.

Another object of this invention is to provide a friction compound which may be inserted in grooves in rails, wheels and brake-shoes, which compound is easily made and which shall have practically the same wearing qualities as the rails and wheels.

Other objects and advantages will be in part obvious and in part more fully brought out as the description proceeds.

In the accompanying drawings, I have illustrated an embodiment of my invention; but it is to be understood that I am not limited to the particular form of rails, wheels and brake-shoes therein shown.

In these drawings:

Figure 1 is a fragmentary view of a railway rail provided with the groove and friction compound of my invention;

Figure 2 is a sectional view of a rail and wheel, showing only so much of the wheel as is necessary to illustrate my invention; and Figure 3 is a fragmentary view of a brake-shoe provided with a groove filled with friction compound according to my invention.

Referring to Figs. 1 and 2 of the drawings, the reference-numeral 1 indicates a railway rail of any well known construction. The head or bearing surface 2 of the rail is provided with a longitudinally extending groove 3 of substantially inverted V-shape. This groove is filled with a friction compound consisting of, approximately, 35% sand, 5% cement, 5% lime, and 55% asphalt. The sand is heated and mixed with the cement and lime and hot asphalt is added to act as a binder. This compound is inserted in the groove 3 so that it is level with the bearing surface 2 of the rail. As the metal of the rail wears away, the surface of the friction compound will also wear, thus presenting at all times a strip of friction material at the bearing surface of the rail. By reason of the shape of the groove 3, the friction compound will be securely retained in place and is prevented from becoming dislodged and falling out.

In Fig. 2, I have illustrated a wheel 4 having a tread 5 resting on the bearing surface of the rail 1. The tread 5 is provided with a peripheral groove 6 of substantially V-shape and so located as to register with the groove 3 in the rail. The groove 6 is filled with the friction compound above described and, as will be seen from an inspection of Fig. 2, the friction compound in the wheel contacts with that in the rail. By this arrangement, much of the wear on the wheel and the rail is taken up by the strip of friction material, thus saving the cost of frequent replacement of worn out wheels and rails. Also, the contact of the friction inserts prevents skidding and thereby materially increases traction.

In Fig. 3, I have illustrated a brake-shoe of any well known construction, the braking face 7 of which is provided with a substantially V-shaped groove 8. This groove is filled with the friction compound above described and is adapted to contact with the friction compound in the wheel when the brake is applied. This arrangement dispenses with the use of sand on the tracks, yet the power of the brakes is increased, thus facilitating and insuring safer stops.

When the rail, wheel and brake-shoe of my invention are used in combination, there will be a resultant increase in traction and braking power and, at the same time, a saving in the cost of maintenance.

It is believed that my invention and its many advantages have now been made clear. It will be obvious that the invention may be applied to any of the forms of rails, wheels and brake-shoes now in use and that it is not limited to the forms herein illustrated.

It will also be clear that two or more grooves may be provided if desired.

What I claim is:

1. The combination of a rail provided with a substantially inverted V-shaped groove containing friction material, and a wheel having a peripheral groove of the same shape as that in the rail and containing friction material adapted to contact with the material in the rail.

2. The combination of a rail having a substantially inverted V-shaped groove extending longitudinally thereof, a friction compound inserted in said groove, and a wheel having a peripheral groove of the same shape as that in the rail and having therein a friction compound adapted to contact with the friction compound in the rail.

3. In combination, a rail having in its bearing surface a substantially inverted V-shaped groove, a friction compound of sand, cement and asphalt inserted in said groove, and a wheel having in its tread a groove of the same shape as that in the rail, the last-mentioned groove being filled with a friction compound similar to that in the rail and adapted to contact therewith.

4. In combination, a rail provided with a substantially inverted V-shaped groove containing friction material, a wheel having a peripheral groove of the same shape as that in the rail and containing friction material adapted to contact with the material in the rail, and a brake-shoe having a groove of the same shape as that in the rail and wheel and containing a friction material adapted to contact with the friction material in the wheel when the brake is applied.

In testimony whereof I affix my signature.

JOHN LAURENCE CONNOLLY.